(12) United States Patent
Raman et al.

(10) Patent No.: US 10,951,431 B1
(45) Date of Patent: Mar. 16, 2021

(54) DEVICE REGISTRY SERVICE

(71) Applicant: Amazon Technologies, Inc., Seattle, WA (US)

(72) Inventors: Amirtha Raman, Seattle, WA (US); Dmytro Gayvoronskyy, Lynnwood, WA (US); William Alexander Stevenson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 15/282,831

(22) Filed: Sep. 30, 2016

(51) Int. Cl.
*H04L 12/28* (2006.01)
*H04L 12/24* (2006.01)
*H04L 29/08* (2006.01)

(52) U.S. Cl.
CPC ...... *H04L 12/2809* (2013.01); *H04L 41/0853* (2013.01); *H04L 67/12* (2013.01)

(58) Field of Classification Search
CPC ....... H04W 24/02; H04W 4/08; H04W 60/04; H04W 88/16; H04W 8/005; H04W 4/005; H04L 12/2803; H04L 12/2807; H04L 12/282; H04L 63/065; H04L 29/06; H04L 29/08072; H04L 63/102709; H04L 63/228; H04L 67/12; H04L 67/16; H04L 12/2809; H04L 12/281; H04L 41/0823; H04L 67/303; H04L 12/66; H04L 41/0813; H04L 67/20; H04L 69/08; H04L 69/18; H04L 69/24; H04L 12/28; H04L 2012/285; H04L 41/0806; H04L 12/2827; H04L 12/2816; H04L 12/2832; G06F 2203/04103; H04M 2242/30

USPC ....... 709/203, 228, 204, 205, 227, 230, 220, 709/224
See application file for complete search history.

(56) References Cited

U.S. PATENT DOCUMENTS

| | | | | |
|---|---|---|---|---|
| 9,021,017 | B2* | 4/2015 | Bowers | H04L 41/0286 709/203 |
| 9,043,474 | B2* | 5/2015 | Schleifer | G06F 15/16 709/227 |
| 9,762,454 | B2* | 9/2017 | Bliss | H04L 41/22 |
| 2004/0019683 | A1* | 1/2004 | Lee | H04L 29/06 709/227 |
| 2004/0143629 | A1* | 7/2004 | Bodin | H04L 29/06 709/205 |
| 2006/0106752 | A1* | 5/2006 | Jones | G06F 17/30 |
| 2006/0150142 | A1* | 7/2006 | Yamamoto | G06F 9/44 717/106 |

(Continued)

*Primary Examiner* — Tonia L Dollinger
*Assistant Examiner* — Linh T. Nguyen
(74) *Attorney, Agent, or Firm* — Lee & Hayes, P.C.

(57) ABSTRACT

Technologies are disclosed for providing a device registry service for devices that communicate over a network. The devices are configured as Internet of Things (IoT) devices. The devices are registered and classified as various types. Based upon the classification, interfaces are provided for the registered devices by the registry service if the devices do not already include them to allow for interaction and control of the devices. New interfaces can be provided to the service by various parties including manufacturers and system integrators to expose additional capabilities of the devices and create additional functionalities. The new interfaces are generally made available to all users of the registry service.

20 Claims, 13 Drawing Sheets

(56) References Cited

U.S. PATENT DOCUMENTS

| | | | | |
|---|---|---|---|---|
| 2012/0117198 | A1* | 5/2012 | Bolduc | G06F 9/541 |
| | | | | 709/219 |
| 2014/0113556 | A1* | 4/2014 | Kotecha | H04W 76/14 |
| | | | | 455/41.2 |
| 2014/0244833 | A1* | 8/2014 | Sharma | H04L 67/16 |
| | | | | 709/224 |
| 2014/0250234 | A1* | 9/2014 | Liesche | H04L 67/025 |
| | | | | 709/228 |
| 2015/0005901 | A1* | 1/2015 | Ferre | G05B 15/02 |
| | | | | 700/19 |
| 2015/0005931 | A1* | 1/2015 | Serjeantson | B65G 43/00 |
| | | | | 700/230 |
| 2015/0067154 | A1* | 3/2015 | Ly | H04L 43/0876 |
| | | | | 709/224 |
| 2015/0081846 | A1* | 3/2015 | Ur-Rahman | H04L 67/141 |
| | | | | 709/218 |
| 2015/0188776 | A1* | 7/2015 | Lee | H04L 12/24 |
| | | | | 716/736 |
| 2016/0055573 | A1* | 2/2016 | Chen | G06Q 30/0641 |
| | | | | 705/26.41 |
| 2017/0105129 | A1* | 4/2017 | Teplin | H04W 24/02 |
| 2017/0141718 | A1* | 5/2017 | Anderson | H02S 10/40 |
| 2017/0142230 | A1* | 5/2017 | Hou | H04L 29/06 |
| 2017/0177538 | A1* | 6/2017 | Jiang | G06F 13/42 |
| 2017/0288894 | A1* | 10/2017 | Marino | H04L 12/28 |
| 2018/0164785 | A1* | 6/2018 | Frederick | G06Q 20/3224 |
| 2018/0183882 | A1* | 6/2018 | Flynn | H04L 29/08 |
| 2018/0239316 | A1* | 8/2018 | Toscano | G05B 15/02 |

\* cited by examiner

DEVICE REGISTRY SERVICE

BACKGROUND

Devices that can communicate and interact with each other are becoming more commonplace. For example, many devices can communicate and interact with each other over a network. An example of such devices includes devices configured to communicate over the Internet. Such an arrangement is generally referred to as the "Internet of Things" ("IoT"). Thus, devices configured as IoT devices can communicate and interact with one another over the Internet. More particularly, generally, Internet of Things refers to a network of physical objects-devices, vehicles, buildings and other items embedded with electronics, software, sensors, and network connectivity—that enables these objects to collect and exchange data. IoT allows objects to be sensed and controlled remotely across existing network infrastructure, creating opportunities for more direct integration of the physical world into computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each Thing is uniquely identifiable through its embedded computing system, but is able to interoperate within the existing Internet infrastructure For example, a building generally has numerous rooms with various arrangements for lighting the rooms. An owner of the building might wish to control lighting within the rooms remotely when the owner is not present. Thus, the owner might have a device that can communicate with the various lighting arrangements within the building over the Internet in order to control the lighting arrangements. Examples of such a device include, for example, mobile devices, computing devices, watches, etc.

As IoT devices become more prevalent, it is becoming more difficult for organizations and individuals to manage and organize their IoT devices. Additionally, there is currently no centralized way in which organizations and individuals can share the functions and capabilities of their IoT devices with each other, or obtain and share interfaces that allow for exposure and access to various functions and capabilities of their IoT devices.

The disclosure made herein is presented with respect to these and other considerations.

DETAILED DESCRIPTION

Figure 1:
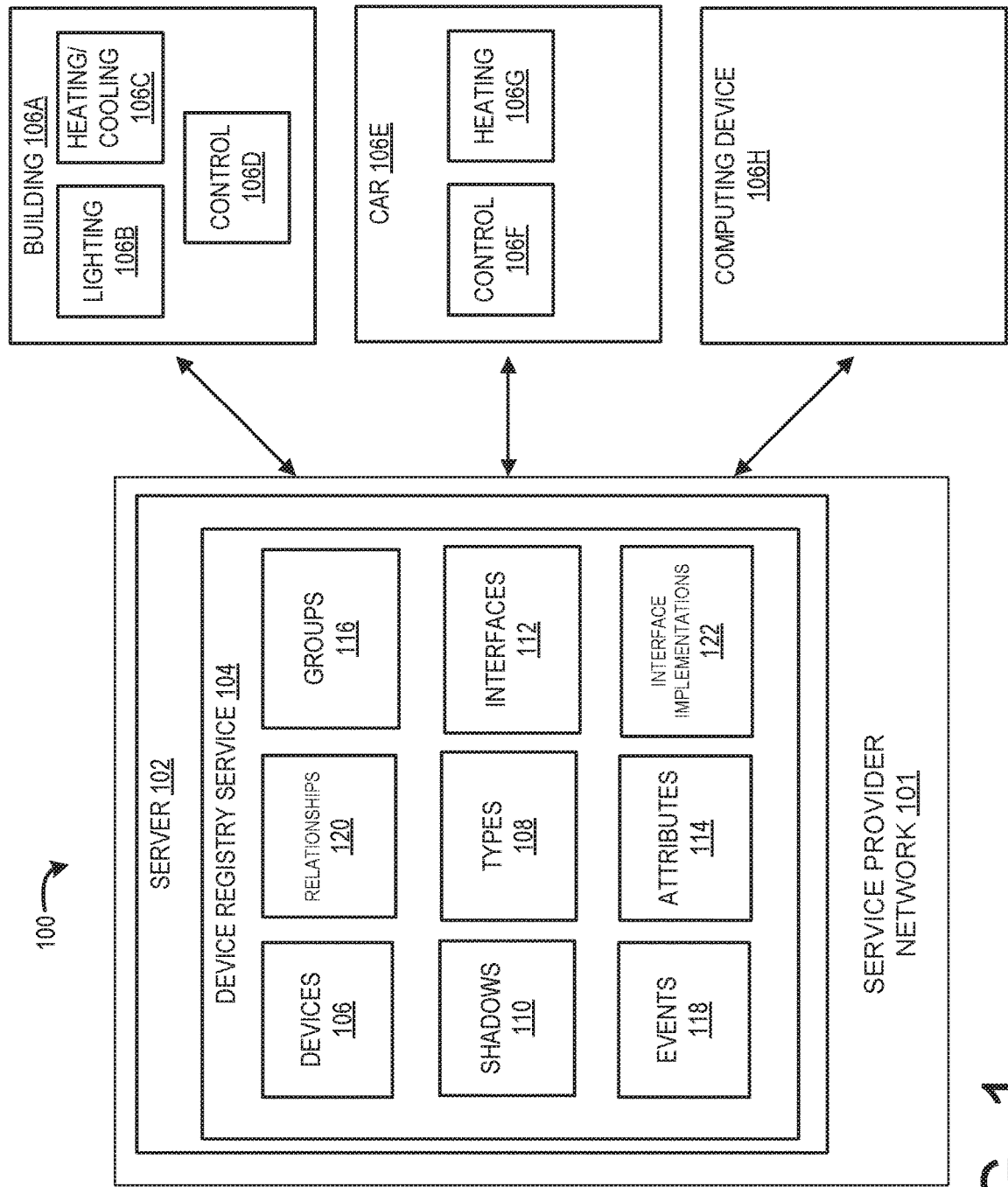
FIG. 1 schematically illustrates an arrangement for a device registry service, according to one configuration.

The following detailed description is directed to technologies for providing a registry service for devices that can communicate and interact with one another over a network such as, devices configured as Internet of Things ("IoT") devices that communicate and interact with one another over the Internet. Generally, the Internet of Things refers to a network of physical objects-devices, vehicles, buildings and other items embedded with electronics, software, sensors, and network connectivity—that enables these objects to collect and exchange data over a network such as the Internet. IoT allows objects to be sensed and controlled remotely across existing network infrastructure, creating opportunities for more direct integration of the physical world into computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each Thing is uniquely identifiable through its embedded computing system, but is able to interoperate within the existing Internet infrastructure.

The device registry service can allow users to organize their IoT devices (which might be referred to herein as "Things") in a unified manner. As used herein, an IoT device may refer to a dedicated purpose device capable of contacting the Internet, e.g., a smart vacuum, a smart thermostat, a smart television, a smart refrigerator, etc., as well as other generic devices that can contact the Internet and interact with other dedicated purpose devices (and other generic devices), e.g., computing devices, smartphones, control panels, control systems, etc. The device registry service also allows for the creation of a unified catalogue of an organization (or individual) of devices that can be shared within or outside of the organization. Users of the device registry service can centralize or distribute the administration and use of the catalogue of devices created at the device registry service, thereby providing global access control and policies that are set by the users. The structure and capability of the user's devices are represented within the catalogue of devices, thereby allowing for discovery of the devices by other devices and allowing for interoperability among the user's devices. The device registry service also allows a user to manage and organize their IoT devices. Additionally, the device registry service provides a centralized way in which organizations and individuals can share the functions and capabilities of their IoT devices with each other, or obtain and share interfaces that allow for exposure and access to various functions and capabilities of their IoT devices. Thus, the devices may operate in a more efficient manner thereby, saving power, reducing CPU time, etc. Technical benefits other than those specifically identified herein might be realized through an implementation of the technologies disclosed herein.

In configurations, a device registry service allows for a user to register their IoT devices or "Things." The devices can generally communicate and interact with each other over a network. In configurations, the network is the Internet and thus, the devices are configured as Internet of Things ("IoT") devices. Generally, the devices are registered with the device registry service based upon a name and/or model, e.g., ABC refrigerator, that can identify capabilities of the Thing. The device can also be registered with the device registry service based upon the capabilities of the Thing, e.g., a refrigerator having certain capabilities. The registry of the device within the device registry service generally identifies the device and what the device can do.

The device registry service also defines types for the devices. The type generally stores a description and a configuration that is common to all devices of a particular type. Generally, a type is defined with a particular schema that is associated with all registered devices of that logical type such that certain interfaces will work with devices of a particular type.

Relationships among devices can also be defined within the device registry service. For example, a relationship can be defined between a car and the car's control panel. Additionally, devices can be organized within groups within the device registry service. Such groups can share a common property or properties and common permissions that apply to all devices within the group can be defined. The groups can be arranged in a hierarchal scheme such that a parent group can have child groups. In general, the interfaces can define requirements for a type that declares that it is capable of implementing the interface, including a set of required operations and their input and output formats, as well as a schema defining a set of attributes for that type and that devices of that type must declare.

The device registry service can also include the interfaces that allow for finding and interacting with other devices. In configurations, the interfaces can be provided by manufacturers of the devices, users of the devices, system integrators, third party application developers, etc.

Generally, when a user registers a device as a Thing with the device registry service, the device is generally classified by a type. Such classification can be by the user or by the device registry service based upon the name and/or model of the device or the capabilities of the device. Once the type has been identified, interfaces at the device registry service for the device can be identified. A device might already include some or all of the identified interfaces, or the device registry service might provide some or all of the interfaces to the device. In some configurations, some capabilities and functions of the device might not be compatible with any of the identified interfaces. In such instances, an interface can be developed by the operator of the device registry service, the manufacturer of the device, the user of the device, a third party developer, etc. Additionally, new interfaces may be provided that make accessing capabilities and functions of the device type easier.

This new interface can then be made available to other users of the device registry service having the same device or other devices classified as that type. Other users can search for new interfaces when new capabilities are desired for their devices. Additionally, the device registry service may automatically provide the new interfaces to other devices of users that are the same or have the same type. Thus, users can describe their devices and system functions and capabilities within the device registry service, thereby allowing users of the device registry service to share various functions, interfaces, etc., among each other.

In an example, an TOT service (not illustrated in the figures), which includes the device registry service 104, can be set up as a publish-subscribe system. For example, devices 106 can subscribe to one or more topics. A topic relates to one or more of a configuration, a feature, a parameter, etc. of a device 106. Thus, for example, a change in a topic of a device can result in a change in a configuration, a feature, a parameter, etc. of the device 106. Through an appropriate publishing system (e.g., using an appropriate protocol or standard, such as a MQ Telemetry Transport (MQTT) standard), a device 106 can receive and/or send information, updates, states and so forth associated with the device 106. In an event of a loss of connectivity, the subscribing device 106 waits for a reconnection—when the connection is re-established, the subscribing device updates through the subscription. On the back end, a registered device 106 is associated with a state (e.g., the shadow 110 illustrated in FIG. 1), and the device 106 also has its own state, as discussed in further detail herein earlier.

Additional details regarding the various components and processes described above for a device registry service will be presented below with regard to FIGS. 1-12.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable electronic devices, minicomputers, mainframe computers, handheld computers, personal digital assistants, e-readers, cellular telephone devices, special-purposed hardware devices, network appliances, and the like. The configurations described herein can also be practiced in distributed computing environments, where tasks can be performed by remote computing devices that are linked through a communications network. In a distributed computing environment, program modules can be located in and executed from both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 illustrates an arrangement 100 that includes a service provider network 101 that includes one or more servers 102. The one or more servers 102 are configured to provide and host a device registry service 104. The device registry service 104 is configured to allow users to register devices 106 as "Things" that are capable of communicating and interacting with other devices or Things over a network such as the Internet. In configurations, a device is therefore configured as an Internet of Things ("IoT") device that communicates with other devices over the Internet. As previously noted, as used herein, an IoT device may refer to a dedicated purpose device capable of contacting the Internet, e.g., a smart vacuum, a smart thermostat, a smart television, a smart refrigerator, etc., as well as other generic devices that can contact the Internet and interact with other dedicated purpose devices (and other generic devices), e.g., computing devices, smartphones, control panels, control systems, etc As will be discussed in more detail herein, the device registry service 104 serves a data service that registers devices 106. In particular, the devices 106 are registered within the device registry service 104 as a virtual representation of the physical devices 106. The device registry service 104 also stores other data related to the devices 106. As will be described in more detail herein, the device registry service 104 can store data identifying a type 108, a shadow 110 related to a particular device 106 and interfaces 112. Additionally, attributes 114 related to the names and/or models of the devices 106 is also stored within the device registry service 104. The devices 106 can be arranged in groups 116. Furthermore, data describing events 118, relationships 120 and interface implementations 122 can also be maintained by the device registry service 104.

FIG. 1 also illustrates various items that might or might not be devices 106 and that themselves can include devices 106. For example, a building 106a can include lighting arrangements 106b that are configured as IoT devices. The building can also include a heating and cooling system 106c and a central control 106d, both of which can be configured as IoT devices and that can be registered with the device registry service 104. Another item might be a car 106e that can include IoT devices 106f and 106g for registry with the device registry service 104. For example, the IoT devices 106f and 106g can be a control panel and heating system, respectively. Additionally, the car 106e can be registered as an IoT device with the device registry service 104. Finally, as another example, a computing device 106h can be registered with the device registry service as an IoT device. Thus, the central control 106d can communicate with and control the heating and cooling system 106c. The computing device 106h can communicate and control the lighting arrangements 106b. Likewise, the control panel 106f can communicate and control the heating system 106g.

As previously noted, the device registry service 104 registers devices 106. Generally, when registering a device 106, data relating to a description of the device is stored within the device registry service 104 including a name and/or a model of the device 106 and its capabilities. The user can use the device registry service 104 to determine what devices 106 exist, as well as a description of each device 106 and the capabilities of the device 106. More particularly, a device 106 describes a specific device or logical entity. A device 106 can represent a physical device, e.g., a light bulb or a switch on a wall. A device 106 can represent a logical entity, e.g., an instance of an application, or physical entity that never connects to the network, e.g., IoT, but which can be related to other devices that do, e.g., a car containing engine sensors, a control panel and other devices, which are Things on their own. The registering of devices 106 can allow for identifying the devices that exist in a user's account, the capabilities that the devices 106 have, and the properties and state of the device 106.

A shadow 110 is generally provided for each registered device 106 within the device registry service 104. The shadow 110 generally stores the current and desired state of the device 106 to which the shadow 110 pertains. The shadow 110 can thus provide an offline view of a device's state and allow for sending requested changes to the corresponding device 106. More particularly, a shadow 110 records the most recent reported and desired state for a device 106. Devices 106 and applications can use the shadow 110 to communicate even if the devices 106 and applications are not both online at the same time. For example, a user can query "what is the most recent state of device X?" Additionally, a user can tell device X to change its state to Y. Likewise, an application or another device 106 can tell device X to change its state to Y.

Relationships 120 can also be defined by a user for the user's device 106 registered at the device registry service 104. Generally, a relationship 120 can be defined between two or more devices, for example, a control panel and the car containing it. Thus, the car 106e and the control panel 106f illustrated in FIG. 1 would be defined as a relationship 120 within the device registry service 104. More particularly, a relationship 120 records a logical relationship between two devices 106 in the device registry service 106. Each end of the relationship is named to allow discovery so that applications knowing a first device 106 can find devices 106 that have a given/named relationship to the first device 106 by knowing the name of the relationship 120.

Figure 2:
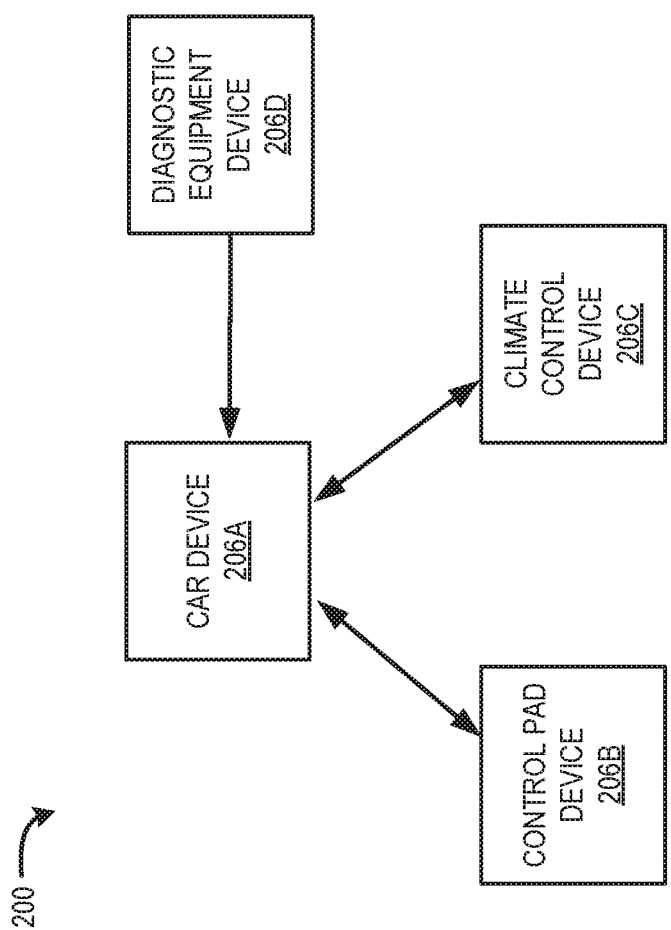
FIG. 2 schematically illustrates an example of a relationship between devices registered with the device registry service of FIG. 1, according to one configuration.

For example, referring to FIG. 2, a car device 206a, a control panel device 206b and a climate control device 206c are schematically illustrated in a relationship hierarchy 200. The control panel device 206b and the climate control device 206c are part of the car and can communicate with one another through the relationship hierarchy 200. The control panel device 206b can interact with or control the climate control device 206c by following its relationship 120a with the car device 206a and then following the car device's relationship 120b the climate control device 206c. Thus, the relationship between the car 206a and the control pad device 206b is bidirectional. Likewise, the relationship between the car 206a and the climate control device 206c is bidirectional. However, for some devices there may only be a unidirectional relationship. For example, a diagnostic equipment device 206d may have a defined relationship with the car device 206a within the device registry service 104 but the car device 206a may not have a defined relationship with the diagnostic equipment device 206d. Knowing about relationships 120 also allows for users to be protected against incorrect relationships where another device 106 does not exist and also allows for protection against stale relationships, where one end of the relationship 120 has been deleted, i.e., a device 106 is no longer registered as a device 106 within the device registry service 104.

Groups 116 can be defined by a user with respect to their devices 106 registered at the device registry service 104. In configurations, a group 116 is an arbitrary collection of devices 106. Generally, the membership of the groups 116 can be changed at any time. The groups 116 can be used to find a set of devices 106 that share some kind of common property or properties. For example, "find all cars that include a satellite navigation system." Common permissions can be set within a group 116 that applies to all devices 106 that have some common logical attribute. For example, allow all cars with satellite navigation systems to utilize the satellite navigation systems without cost.

More particularly, groups 116 can have a single parent group and multiple child groups. For example, a parent group can be a hospital and child groups can be, for example, departments within the hospital, floors within the hospital, etc. In accordance with configurations, a parent of a group is set at creation. Generally, devices 106 in the device registry service 104 can be added to or removed from groups 116 at any time. Groups 116 can have attached policies that can be inherited by all devices 106 within a group 116. This includes a group 116 that contains a particular group 116 that includes devices 106. In accordance with configurations, groups 116 can also have a type, e.g., an "over the air update" group.

A device 106 generally cannot be in two groups 116 that have the same type at the same time. Groups 116 can have attributes associated with them and thus, for a particular device 106, a user can retrieve the attributes for the groups 116 containing the device 106. Groups 116 allow for related devices 106 to be given access to a common set of resources and topics. Furthermore, groups 116 allow for actions to be performed on a set of devices 106. For example, lighting arrangements (devices 106) within a building (group 116) can be checked to see the last time each lighting arrangement reported its state.

In configurations, a type 108 includes a description of the type 108 and a configuration that is common to all devices 106 of some logical type of device. For example, a type 108 can be a specific brand of a device 106. For example, refrigerators can be registered as devices 106. A type 108 among the refrigerators might, for example, be all refrigerators manufactured by ABC Manufacturer. To create a type 108, e.g., ABC Refrigerators, the type 108 is created with a certain schema that is associated with all devices 106 of that logical type. Thus, any code, e.g., interfaces, that works with devices 106 of that logical type will work and be able to interact with other devices' of that logical type. A user and devices 106 can search and discover other devices 106 within the device registry service 104 based upon types 108, thereby discovering interfaces 112 that can be used with the user's devices 106 of the same type 108. An interface 112 can define requirements for a type 108 that declares that it is capable of implementing the interface 112, including a set of required operations and their input and output formats, as well as a schema defining a set of attributes 114 for that type 108 and that devices 106 of that type 108 must declare.

More particularly, types 108 define the logical type of a device 106, e.g., a light bulb. The type 108 defines a list of searchable attributes 114 for the devices 106 defined within the type 108. Generally, users can get a list of all types 108 for the device registry service 104. The users can search and find or discover devices 106 (theirs and/or other users') within the device registry service 104 based upon type 108. In accordance with configurations, a device 106 can only be associated with a certain type 108 only if the device 106 meets the requirements defined for that type 108, i.e., the device 106 includes the attributes 114 defined by the type 108. The type 108 can control how the device registry service 104 indexes devices 106 and can define a schema for a shadow 110 and attributes 114. The type 108 can also define a set of type interfaces that devices 106 of that type 108 support.

In configurations, interfaces 112 are generally a set of operation definitions, a device type property schema and a device attribute schema that defines an interface for finding and interacting with a device 106. For example, a common interface can be defined for interacting with devices 106 that can be used across multiple different devices 106 and vendors, e.g., a light bulb interface that supports operations "turn off" and "turn on," or an "owned by" interface that defines that devices 106 are searchable based upon the owner.

More particularly, a interface 112 defines an interface that can be used to interact with devices 106 in the device registry service 104. The interface 112 defines a set of operations and attributes that a type 108 implementing the interface 112 should provide. In general, a interface 112 can be referenced across a user's account within the device registry service 104. As previously noted, a interface 112 can define requirements for a type 108 that declares that it is capable of implementing the interface 112, including a set of required operations and their input and output formats, as well as a schema defining a set of attributes 114 for that type 108 and that devices 106 of that type 108 must declare.

Generally, users can view a list of devices 106 that provide a specific interface 112 and find the full list of interfaces 112 available for a given device 106. A subset of the attributes 114 defined by the interface 112 can be marked as "searchable" and users can then search for devices 106 that provide that interface 112 using those attributes 114. A interface 112 can declare that it permits other interfaces 112, in which case a type 108 that makes such a declaration must also meet the requirements and provide the implementations for all of the operations declared and defined in all of the inherited interfaces 112.

Examples of interfaces 112 include defining an interface 112 that any manufacturer can implement to make their devices controllable by/from a standard control panel or application. For example, a light bulb interface can be defined with a turn on/turn off operation and a get status operation. Thus, light bulb manufacturers would include such an interface with light bulbs that the manufacturer makes, to thereby allow the light bulbs to be controlled by standard or general control panels or applications. Additionally, an extension can be defined for an existing interface that adds new functionality. For example, a dimmable light bulb interface can be defined that extends the light bulb interface and adds the operation of setting a light level, e.g., a percentage of light to be emitted by the light bulb.

An interface 112 can also be provided that supports two applications or devices 106 that expect different interfaces 112 for devices 106 to do the same task. For example, an interface 112 can be provided for a thermostat in order to support Vendor A's control panel that expects "set desired temperature (centigrade)" and Vendor B's control panel that expects "set desired temperature (Fahrenheit)". The two vendors can each provide their own interfaces to the device registry service 104. The type 108 for the thermostat can then declare that it provides and supports both interfaces and specifies an implementation for Vendor A's interface and an implementation for Vendor B's interface, with each implementation interpreting the input the way the particular vendor expects it to be interpreted.

Additionally, an interface 112 can be used to integrate across manufacturers. For example, a house can include a furnace from Company A, an air conditioner from Company B, and temperature sensors from Company C. The owners of the house might want a thermostat to operate both the furnace and the air conditioner, and the thermostat comes from Company D. Thus, Company A creates an interface for their furnace with methods to control the furnace and obtain its status, and creates a furnace type 108 that implements that interface. Company A also creates a device 106 to represent the furnace with a new furnace type 108. The furnace type 108 and the furnace device 106 are provided to the device registry service 104. Companies B and C do the same thing for their types and devices. Company D requests the interfaces 112 from Companies A, B and C and creates a thermostat that can be registered as a device 106 and type 108 with the device registry service 104, where the thermostat knows how to use the interfaces from Companies A, B and C to manage the temperatures. The owners of the home buy the thermostat from Company D, register the thermostat with the device registry service 104 and give the thermostat permissions to find and act on the user's devices 106 from Companies A, B and C within the device registry service 104. The thermostat uses the interfaces for those devices 106 to manage the temperature in the house.

Thus, in configurations, when users register their devices with the device registry service 104, interfaces 112 might already be included on the devices 106 being registered. If needed interfaces are not included on the registered devices 106, the user and/or the devices 106 can search the date registry service 104 for needed interfaces based upon device type 108. Also, the device registry service 104 may automatically provide the needed interfaces to the device 106. If needed interfaces are not available, then the user can develop their own interface, an operator of the device registry service 104 can develop the interface, the manufacturer of the device 106 can develop the interface, or a third party developer can develop the interface. Additionally, new interfaces may be provided that make accessing capabilities and functions of the device type easier.

Once the interface has been provided for the device 106, the device registry service 104 can make the new interface available to other users for their devices 106 that have the same type 108 by providing a description of the new interface. The description of the new interface can be provided directly to the users and/or the devices 106 by the device registry service 104 and the new interface can be placed within a data store that can be retrieved by other users and other devices 106. The data store can be searched by other user and devices 106 and the new interface can be discovered by other users and other devices 106.

In configurations, third party integrators can also develop interfaces 112 for devices 106. For example, a heating and cooling entity might be developing heating and cooling systems for various buildings that utilize numerous different components. Thus, the heating and cooling entity can develop interfaces, or can have another party develop interfaces, for use with various devices 106 within the heating and cooling systems. Once again, the developed interfaces can be provided to other users and/or devices 106 within the device registry service 104.

An event 118 is an event a device 106 of a specific type 108 can send. Events 118 generally define a set of events that an integrator can attach actions to, e.g., a button defines a button pressed event that an integrator could attach a rule to, e.g., turn on/off lights in the room when the button is engaged or activated. More particularly, events 118 define events that can be sent by a device 106 of a given type 108. The event definition defines the format of the contents of the event 118 and how to attach a rule or action to the event 118. Thus, a event 118 can be defined where a device 106 is a slider switch. The event 118 can be when a slider switch sends a switch position changed event with contents of a position between a range of numbers, then an action can be attached to the event. For example, a rule can be added where when the switch position changed event is sent that dims the output of the lights in a room, the output of lights are dimmed to match the value of the position that the slider switch has moved to.

An interface implementation 122 is a set of operation implementations and properties that define how a specific type 108 implements an interface 112. Generally, a user of a device 106 does not need to know how the implementation of an interface 112 is achieved. The user simply uses the interface 112 and the device registry service 104 dispatches operations based on the implementation of the particular interface 112 for the corresponding device 106. For example, an interface implementation 122 can define how one specific type 108 implements an interface, e.g., a particular light bulb implements a light bulb interface utilizing functions that call out "turn on" a particular light bulb and "turn off" the particular light bulb.

Attributes 114 generally describe a specific device 106 as defined by an interface 112. The attributes 114 can define a device 106 in such a way that software that recognizes an interface 112 can understand and interact with the specific device 106. For example, for a locatable device interface that defines that a device 106 needs to have a searchable location field of "building floor room", the device registry service 104 would include an entry for each device 106 of a particular type 108 so that control panels can search for devices 106 that implement the locatable device interface on their floor or in their room so that the control panels know what particular devices they can control.

Figure 3:
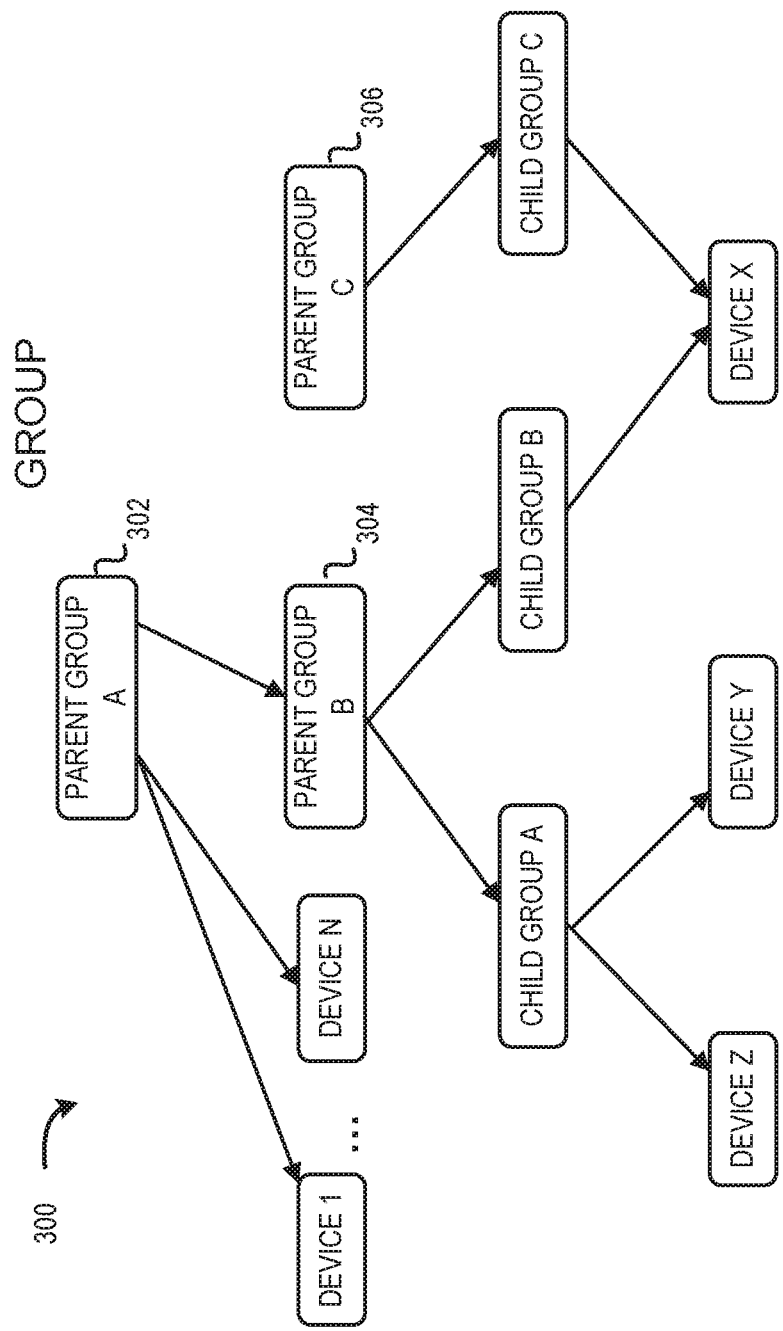
FIG. 3 schematically illustrates a hierarchical arrangement of groups of devices that have been registered with the device registry service of FIG. 1, according to one configuration.

As previously noted, groups 116 allow users to group devices or types 116. This allows users to group their devices 106 into different catalogues and build hierarchal structures. By allowing users to attach policies to a particular group 116, all devices 106 inside the group 116 will automatically inherit the particular group's policy. This makes permission control for devices 106 easier for users. Groups 116 can be used to define bulk actions, e.g., using a group 116 to provide an update to devices 106 in the group 116. Thus, all devices 106 in the group 116 will be fetched and the same action will be applied to all devices 106 in the group 116, e.g., the update. FIG. 3 illustrates a possible example of a group hierarchy 300. Parent groups 302, 304 and 306 are defined. Parent group 304 is a child group of parent group 302. Parent group 302 also includes device 1 through device N. Since parent group 304 also includes child groups A and B, then parent group 302 also includes child groups A and B. Also, since child group A includes device Z and device Y, and child group B includes device X, then parent group 302 also includes device Z, device Y and device X.

Generally, if a group 116 needs to have a parent, then in accordance with configurations, the parent is specified at group construction time. Attributes of a group 116 can be added, deleted and updated within the device registry service 104 from time to time. Devices 106 can also be added and removed to and from group 116. All groups 116 for a particular user can be listed within the device registry service 104 and the user can filter devices 106 based upon the groups 116. Generally, the device registry service 104 can list parent groups of a device 106, including a non-direct parent group. The device registry service 104 can also list direct or non-direct child groups of a parent group. All devices 106 in a group 116 can be listed and policies for a group 116 can be attached and detached. The group policies can be listed and inherited device policies can be listed if the device is in one or more groups 116.

Generally, groups 116 can be searched using group searchable attributes, and groups 116 can also be searched based upon a device type label for the group 116. Devices 106 in a group 116 can be searched using attributes 114. Users can be notified for changes in a group, e.g., creation and updates of the group policy, and devices 106 added/removed to/from a group 116. Group hierarchies can be modified and a group 116 can be detached from its parent group. In configurations, a parent group can be changed and groups 116 can be dynamically created. Generally, a cycle is not allowed in group hierarchy. In other words, a parent cannot be its own parent. For example, Group A cannot be the parent of Group B, Group B being the parent of Group C, with Group C being the parent of Group A.

The device registry service 104 supports operations of group and device management, and is generally the source for group metadata. The device registry service 104 generally supports policy creation and group and policy relation management.

Figure 4A:
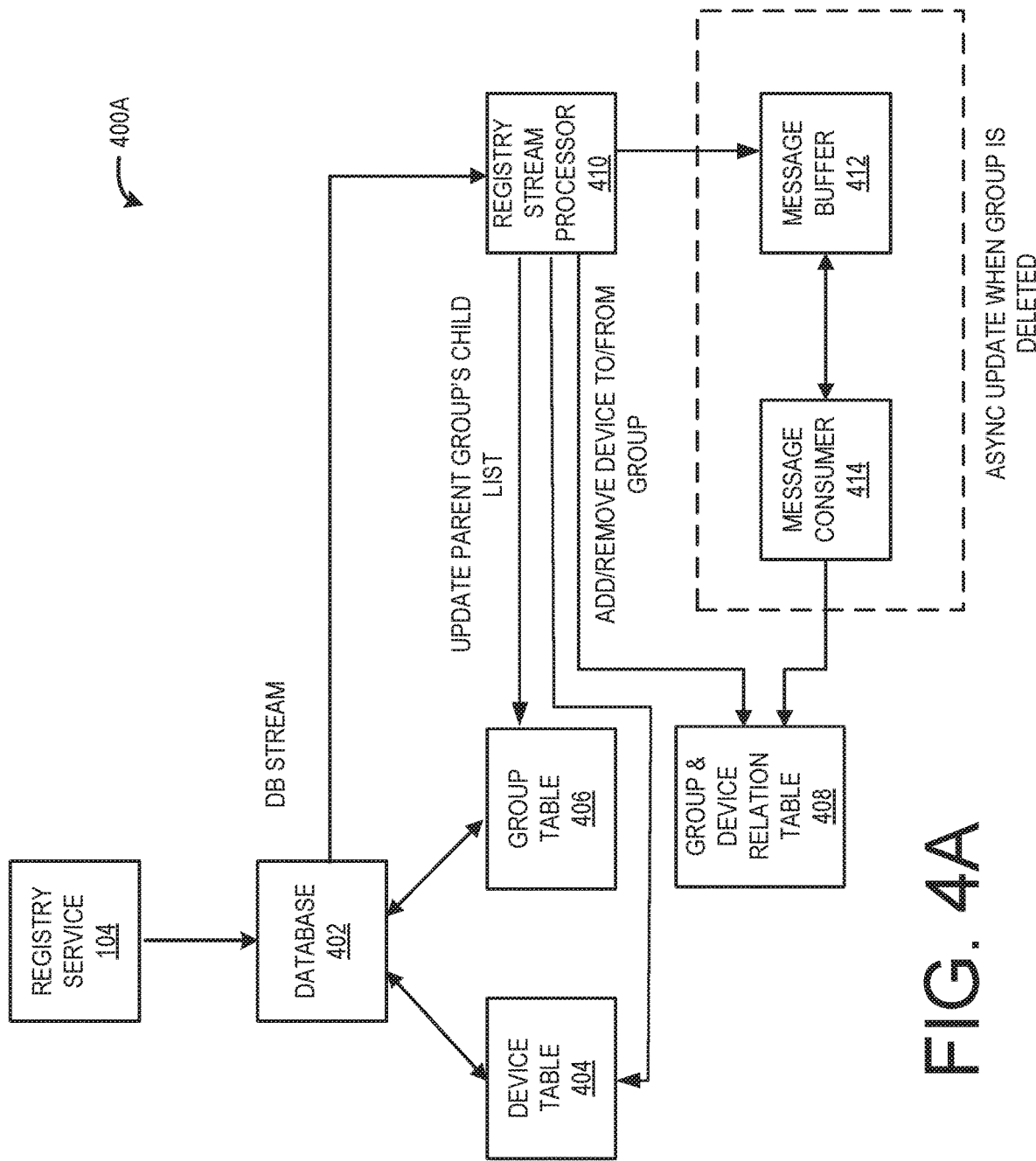
FIGS. 4A and 4B schematically illustrate components for creating groups and tables for devices that have been registered with the device registry service of FIG. 1, according to one configuration.

Referring to FIG. 4A, an arrangement 400a is illustrated, where the device registry service 104 includes and utilizes a database 402 to store group metadata and hierarchies and group/device relationships. The database 402 generally stores all device related data for the device registry service 104. As will be described in more detail herein, the arrangement 400 may be used for adding and deleting groups 116, as well as adding and removing devices 106 from groups. 116. Triggered by a database stream (DB stream) of a device table 404 and a group table 406, a device 106 will be added or removed from a group/device relation table 408 by a registry stream processor 410. In configurations, a synchronous ("sync") data update process can be used when a group 116 is deleted. Deletion of a group 116 generally triggers an asynchronous ("async") data update process.

Figure 4B:
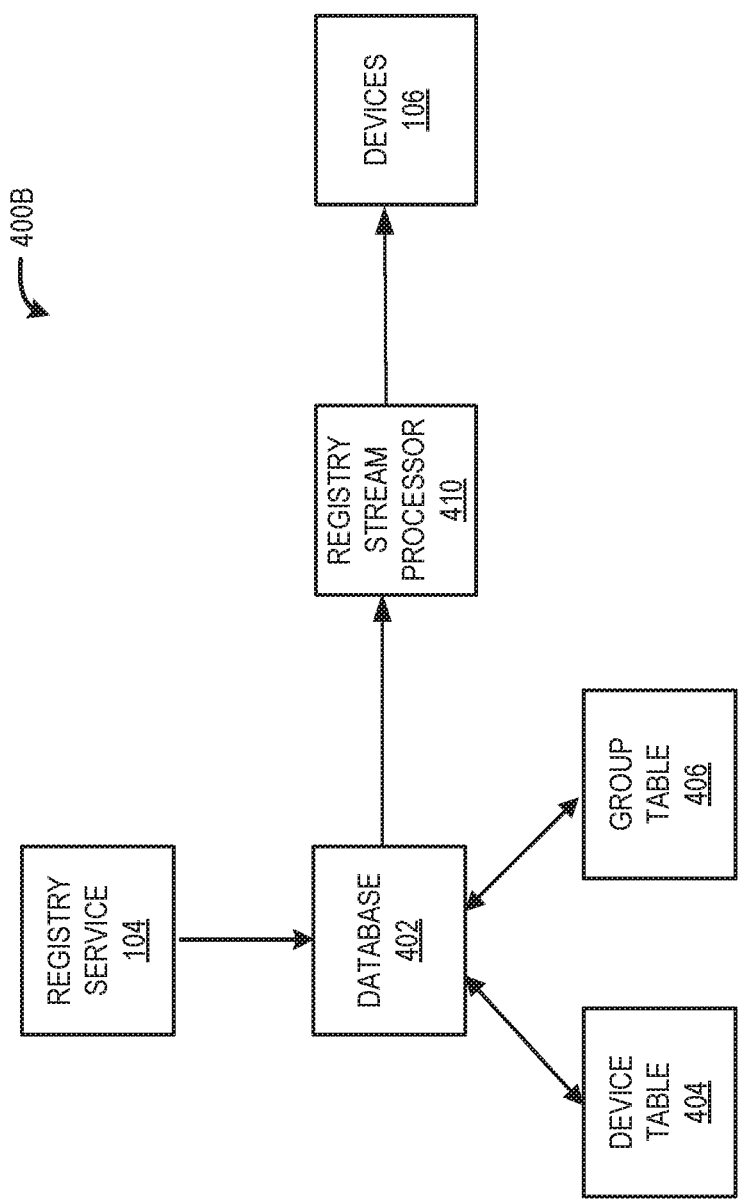

The registry stream processor 410 generally calls a "remove device from group" network service application programming interface ("API") to remove a deleted group from a device's parent group list. Messages from the registry stream processor 410 can be provided to a message buffer 412 and then consumed by a message consumer 414 to delete the group from the group and device relation table 408. FIG. 4B illustrates a portion arrangement 400a as arrangement 400b where the registry stream processor 410 informs devices 106 about changes and updates to groups 116. The registry stream processor 410 may push notifications about changes and updates to devices 106, or the devices 106 may poll the registry stream processor 410 for information about changes and updates.

In accordance with configurations, the device table 404 and the group table 406 can be stored in a network accessible database, thereby allowing for parallel transactions to occur. In configurations, removal of a parent group removes child groups as well.

Figure 5:
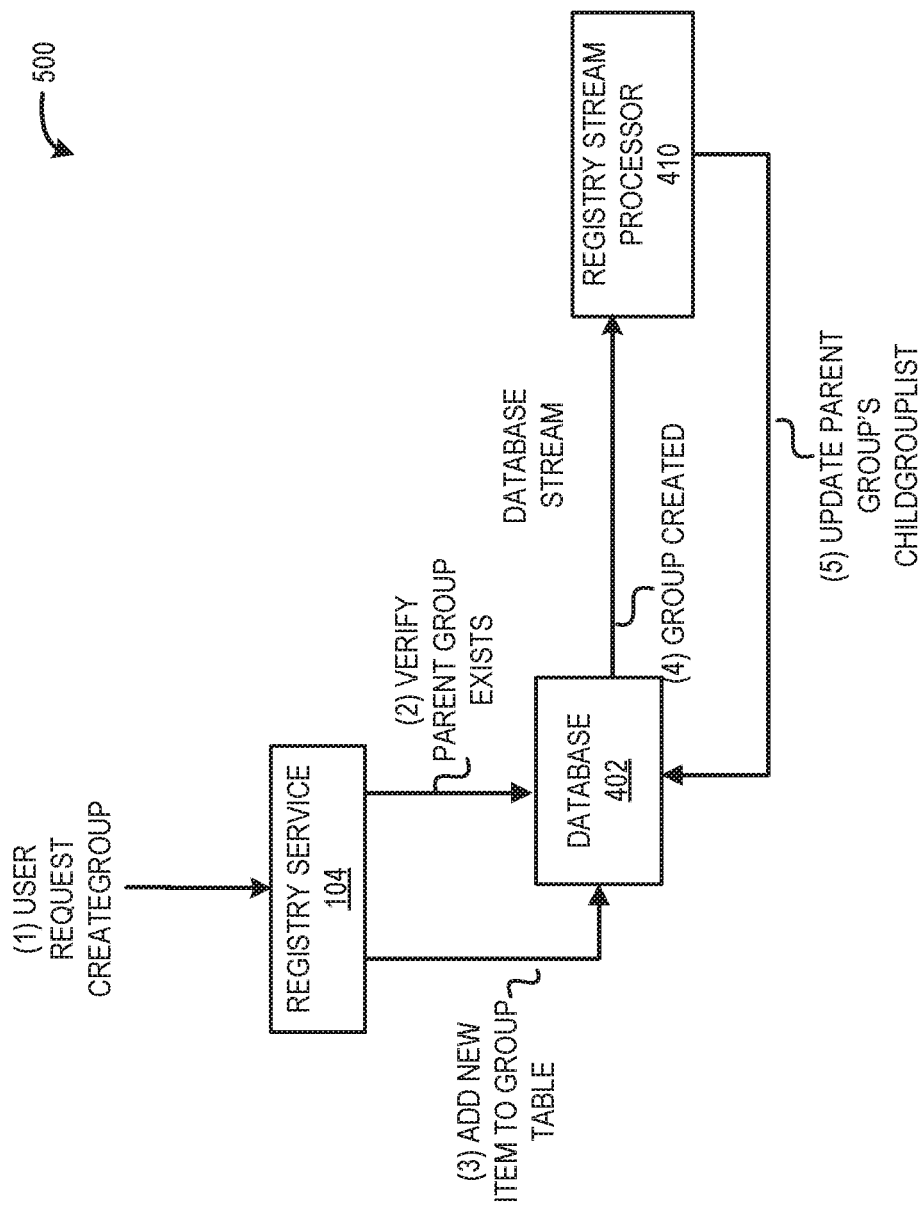
FIG. 5 schematically illustrates a flow for creating a group of devices, according to one configuration.

Referring to FIG. 5, a flow 500 for creating a group 114 will be described. In general, a user requests to create a group 114 with group properties. The device registry service 104 calls an API associated with creating groups. If a parent group is specified, then it is verified whether the parent group actually exists. A put request is provided to the database 402 to create a particular child group if it is verified that the parent group exists. The registry stream processor 410 captures this event and updates the parent group's child group list in the database 402.

Figure 6:
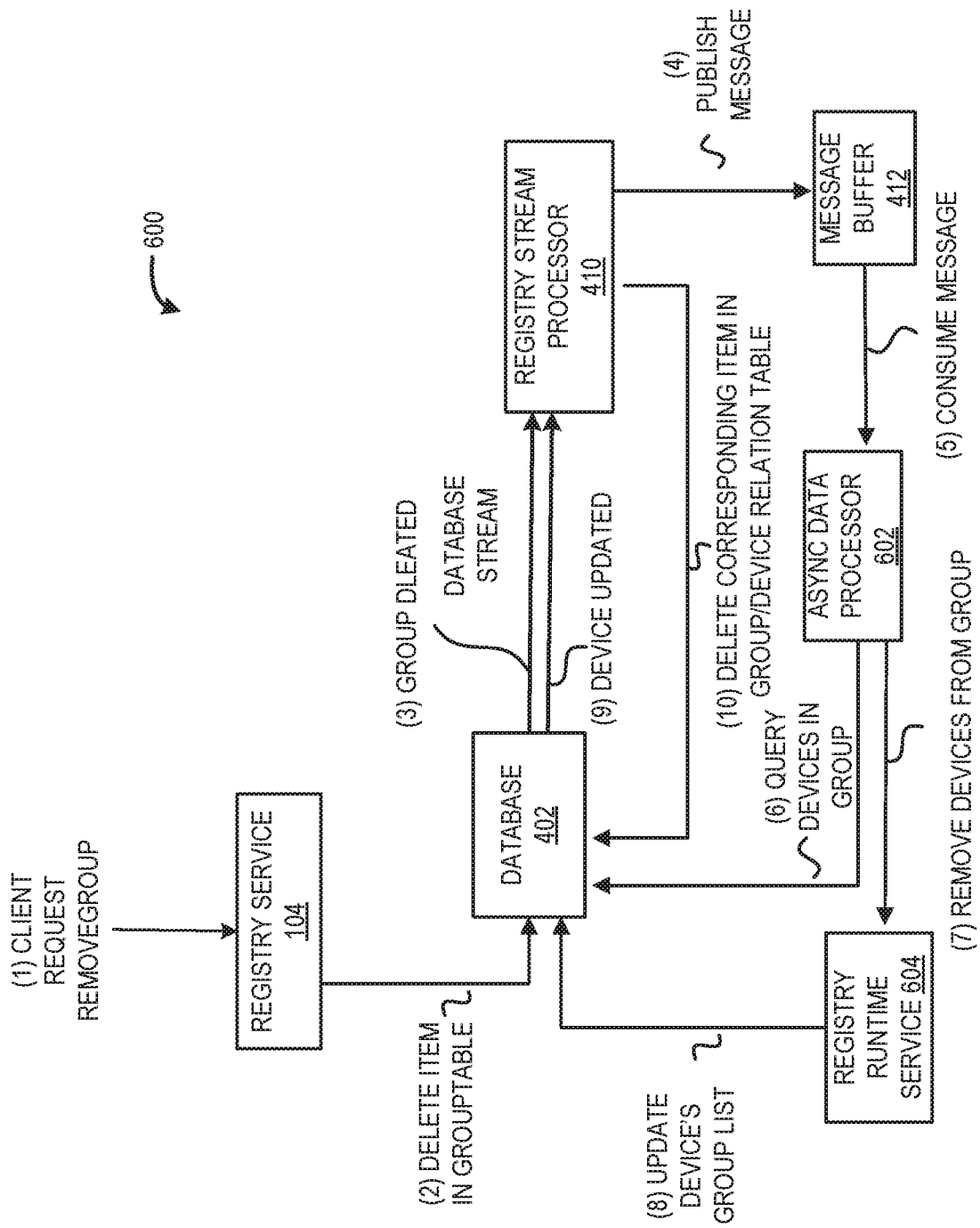
FIG. 6 schematically illustrates a flow for deleting a group of devices, according to one configuration.

Referring to FIG. 6, a flow 600 for removing a group 114 will be described. A user requests a group be removed and the device registry service 104 calls an API for removing a group. If it is verified that the group exists, the group is deleted on the database 402. In configurations, if it is verified that the group exists, a response can be returned to the user that confirms that the group has been deleted.

Device deletion in the group table is captured in the database stream and the registry stream processor 410 captures the group deleted event and updates the parent group's child group list. In configurations, it is allowable to delete a group when devices 106 are still associated with the group. Thus, the registry stream processor 410 also needs to remove devices 106 in the deleted group and thus calls an API for "remove device from group", as will be discussed in more detail herein. However, removing devices 106 from groups 116 can take a large amount of time if the group 116 includes many devices 106. Thus, the message buffer 412 can be utilized along with an async processor 602 in order to remove devices from a deleted group in order to keep the database stream available.

In such a configuration, the registry stream processor 410 can send a message to the message buffer 412, where the message includes parameters of an API for obtaining devices 106 in a group 116. The async processor 602 retrieves the message and obtains the identity of the first batch of devices 106 by querying the group/device table. For each of the devices 106, the async processor 602 calls the API "remove device from group" and removes devices 106 from the group via the registry runtime service 604 After successfully updating the first batch, the async processor 602 retrieves a second message, which will kick off the next batch of device updates.

Figure 7:
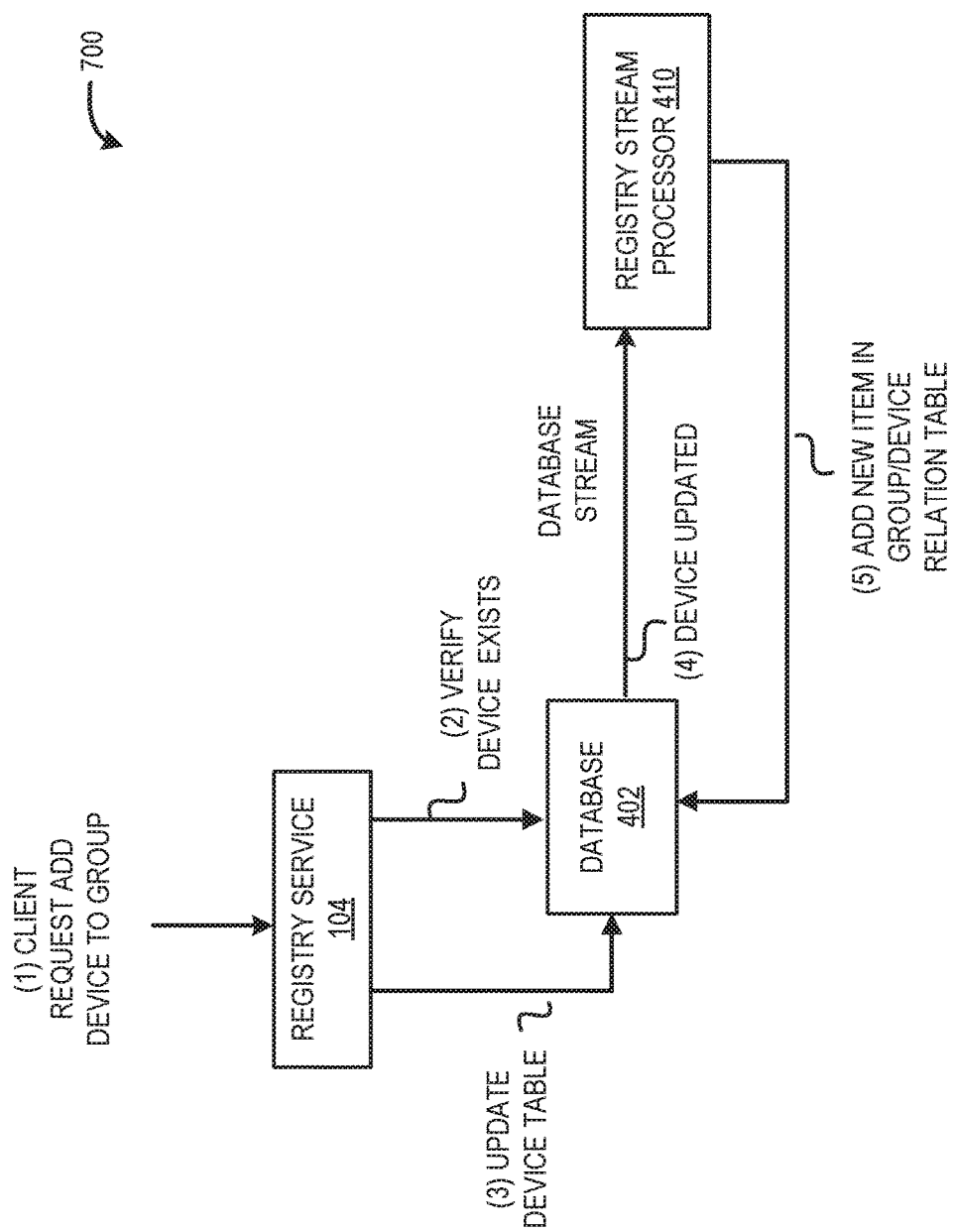
FIG. 7 schematically illustrates a flow for adding a device to a group, according to one configuration.

Referring to FIG. 7, a flow 700 for adding a device 106 to a group 114 will be described. The device registry service 104 calls an API for adding a device 106 to a group 116 with both the device name and the group name being provided. It is verified that the device 106 exists. The group information is obtained in order to verify that the group exists.

A group identifier is added to the device's parent group list in the database 402 and the request is committed to the database 402. A response is returned to the user that confirms that the device 106 has been added to the group 116 and the registry stream processor 410 captures the particular item update event.

For deleting a device from a group, the process is similar. The device registry service 104 calls an API for delete device 106. It is verified that the device 106 exists and a delete request is issued. The registry stream processor 410 captures the device item deleted event that includes the parent group list. The registry stream processor 410 then sends a delete request directly to the group/device relation table in the database 402 for all related direct parent groups of this device 106. It is to be appreciated that the examples given above are merely illustrative and that other techniques can be used for registering devices, e.g., an IoT device, within a device registry service 104 in other configurations.

It is to be appreciated that the examples given above are merely illustrative and that other techniques can be used for providing a device registry service and registering devices, e.g., IoT devices, within the device registry service in other configurations. Additional details regarding the arrangements shown in FIGS. 1-7 will be provided below with respect to FIG. 8.

Figure 8:
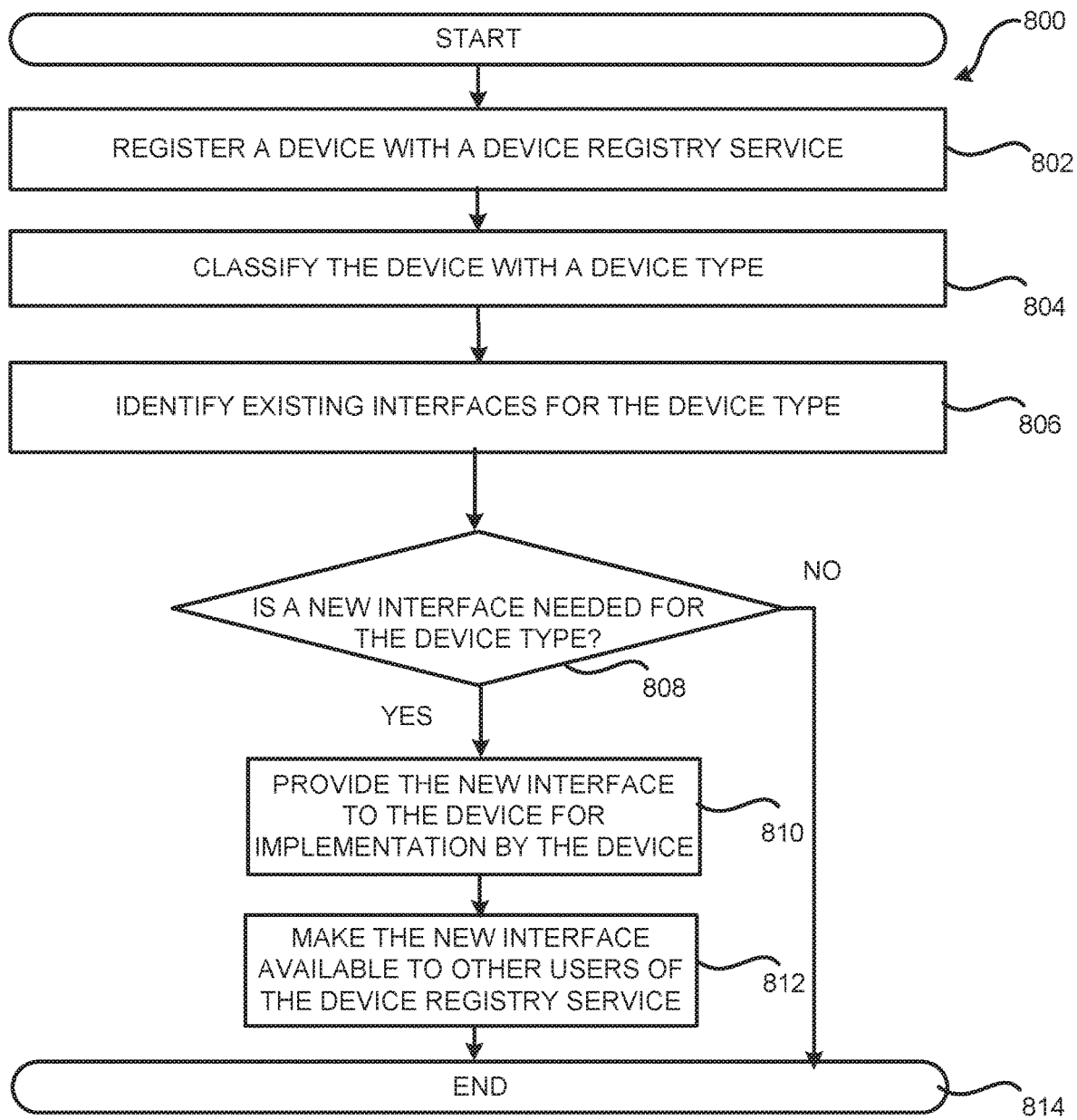
FIG. 8 is a flow diagram showing a routine for registering a device with a device registry service, according to one configuration.

FIG. 8 include flow diagrams showing routine 800 that illustrates aspects of mechanisms for registering devices with a device registry service as described with respect to FIGS. 1-7.

It is to be appreciated that the logical operations described herein with respect to FIG. 8 (and the other FIGS.) can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 800 begins at operation 802, where a device, e.g. device 106, is registered with a device registry service, e.g., device registry service 106. At operation 804, the device is classified with a device type, e.g., type 108. As previously noted, the device type relates to capabilities of the device. From operation 804, the routine 800 proceeds to operation 806 where existing interfaces, e.g., interfaces 112, for the device type are identified. The existing interfaces are at least one of (i) included with the device or (ii) stored at the device registry service, wherein the interfaces allow for interaction of the device with other devices registered with the device registry service.

At operation 808, it is determined if a new interface is needed for the device type based upon capabilities of the device for which the existing interfaces are not ideal, e.g., at least in part incompatible. If a new interface is not needed, then the routine 800 proceeds to operation 814, where it ends. If a new interface is needed, then the routine 800 proceeds to operation 810, where the new interface is provided to the device for implementation by the device. At operation 812, the new interface is made available at the device registry service to other users of the device registry having devices classified as the device type. From operation 812, the routine 800 proceeds to operation 814, where it ends.

Figure 9:
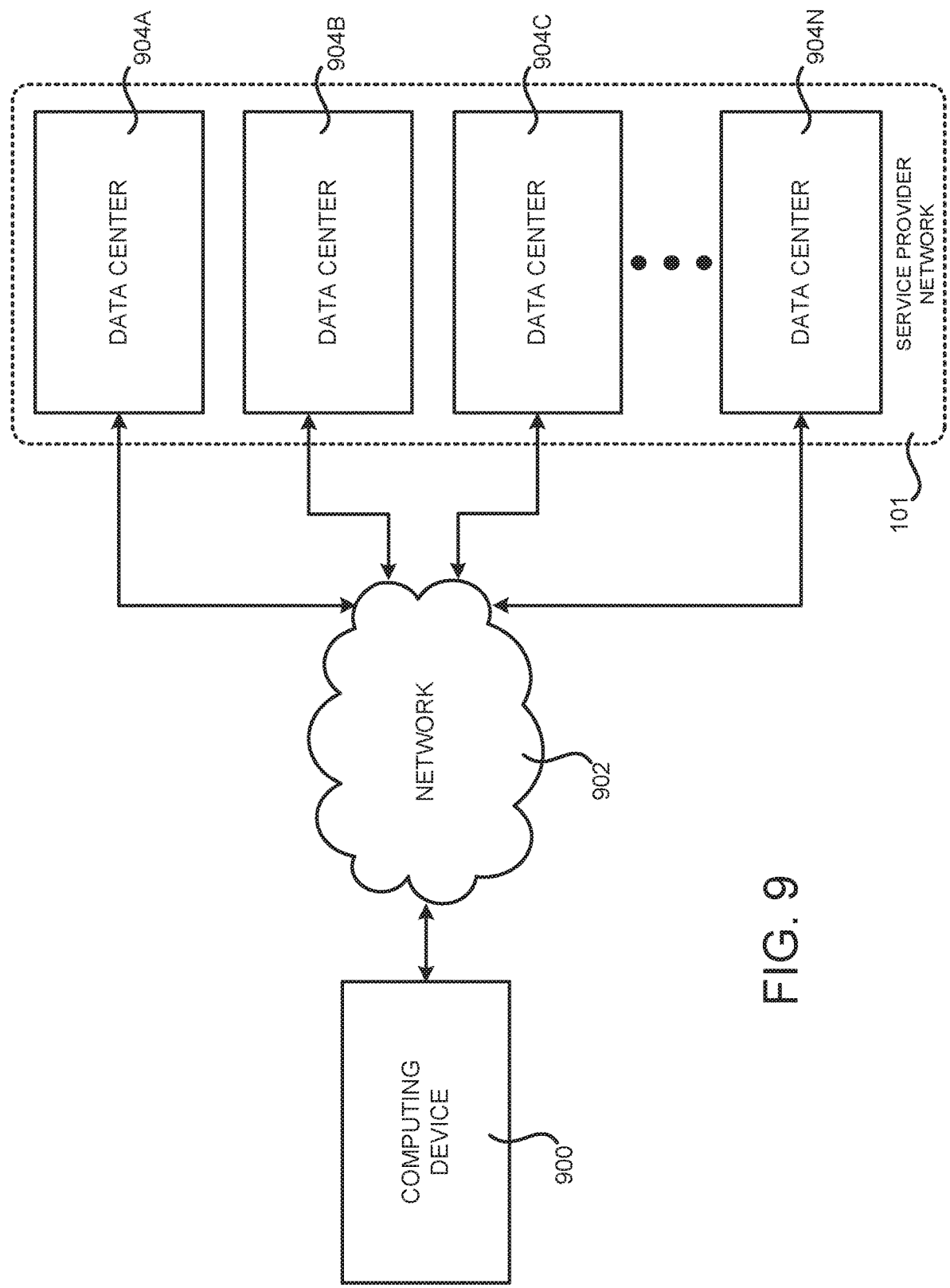
FIG. 9 is a system and network diagram that shows an illustrative operating environment that includes a service provider network that can be configured to implement aspects of the functionality described herein.

FIG. 9 is a system and network diagram that shows one illustrative operating environment for the configurations disclosed herein that includes a service provider network 101 that can be configured to implement the device registry service 106. Among other types of functionality, the service provider network 101 can be utilized to implement the various components described above.

The device registry service provided the service provider network 101 is enabled in one implementation by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations. One illustrative configuration for a data center 904 that can be utilized to implement the technologies disclosed herein will be described below with regard to FIG. 10.

The customers and other users of the service provider network 101 can access the device registry service provided by the service provider network 101 over a network 902, which can be a wide area communication network ("WAN"), such as the Internet, an intranet or an Internet service provider ("ISP") network or a combination of such networks. For example, and without limitation, a computing device 900 operated by a customer or other user of the service provider network 101 can be utilized to access the service provider network 101 by way of the network 902. It should be appreciated that a local-area network ("LAN"), the Internet, or any other networking topology known in the art that connects the data centers 904 to remote customers and other users can be utilized. It should also be appreciated that combinations of such networks can also be utilized.

Figure 10:
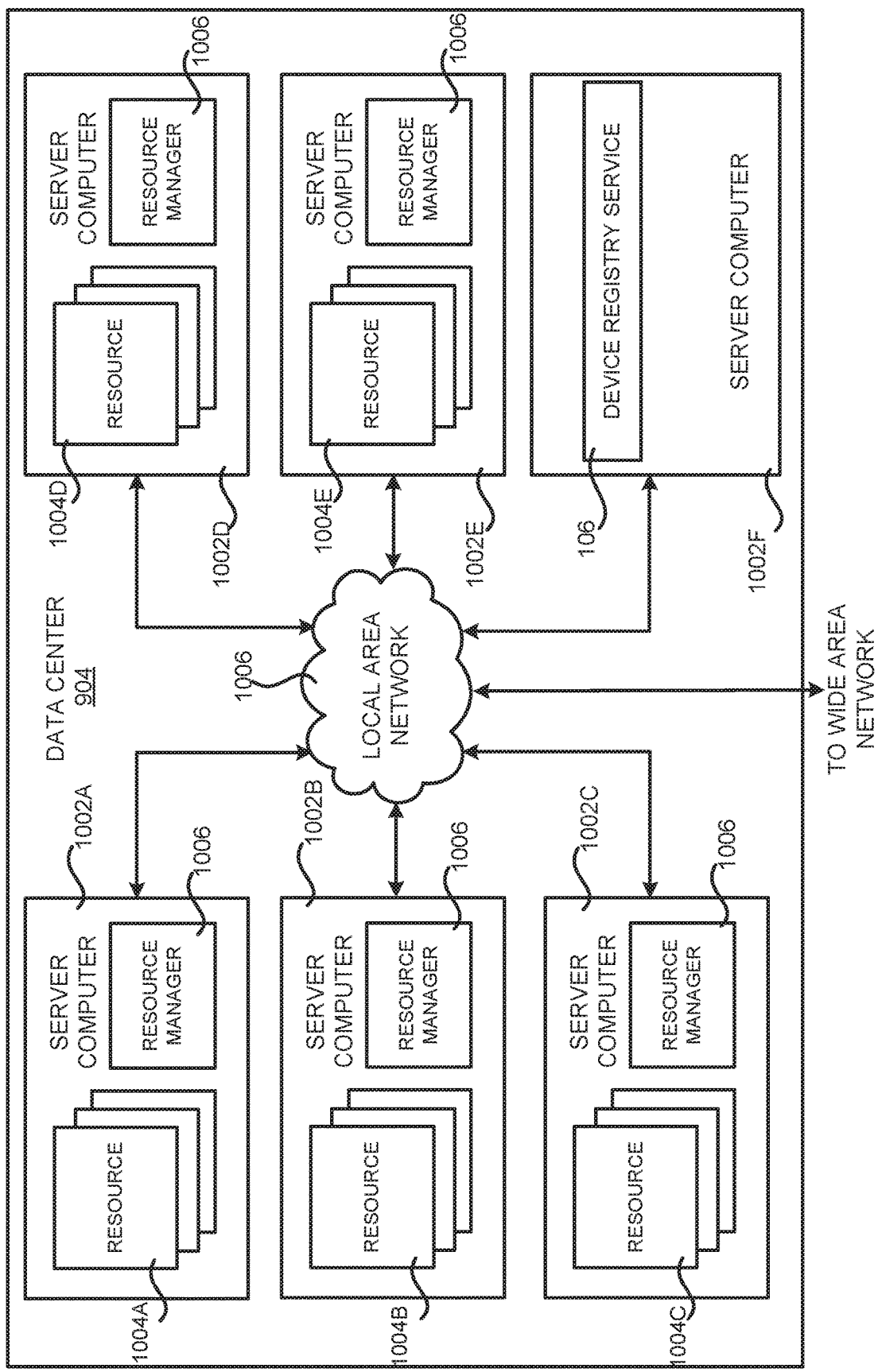
FIG. 10 is a computing system diagram illustrating a configuration for a data center that can be utilized to implement aspects of the technologies disclosed herein.

FIG. 10 is a computing system diagram that illustrates one configuration for a data center 904 that can implement the technologies disclosed herein. The example data center 904 shown in FIG. 10 includes several server computers 1002A-1002F (which might be referred to herein singularly as "a server computer 1002" or in the plural as "the server computers 1002") for providing computing resources 1004A-1004E.

The server computers 1002 can be standard tower, rack-mount, or blade server computers configured appropriately for providing the computing resources 1004 described herein (illustrated in FIG. 10 as the computing resources 1004A-1004E). The computing resources 1004 provided by the service provider network 101 can be data processing resources such as VM instances or hardware computing systems, computing clusters, data storage resources, database resources, networking resources, and others. Some of the servers 1002 can also be configured to execute a resource manager 1006 capable of instantiating and/or managing the computing resources 1004. In the case of VM instances, for example, the resource manager 1006 can be a hypervisor or another type of program configured to enable the execution of multiple VM instances on a single server computer 1002. Server computers 1002 in the data center 904 can also be configured to provide network services and other types of services, some of which are described in detail below with regard to FIG. 11.

The data center 904 shown in FIG. 10 also includes a server computer 1002F that can execute some or all of the software components described above. For example, and without limitation, the server computer 1002F can be configured to execute device registry service 106. The server computer 1002F can also be configured to execute other components and/or to store data for providing some or all of the functionality described herein. In this regard, it should be appreciated that the components illustrated in FIG. 10 as executing on the server computer 1002F can execute on many other physical or virtual servers in the data centers 904 in various configurations.

In the example data center 904 shown in FIG. 10, an appropriate LAN 1006 is also utilized to interconnect the server computers 1002A-1002F. The LAN 1006 is also connected to the network 902 illustrated in FIG. 9. It should be appreciated that the configuration and network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 904A-904N, between each of the server computers 1002A-1002F in each data center 904, and, potentially, between computing resources in each of the data centers 904. It should be appreciated that the configuration of the data center 904 described with reference to FIG. 10 is merely illustrative and that other implementations can be utilized.

Figure 11:
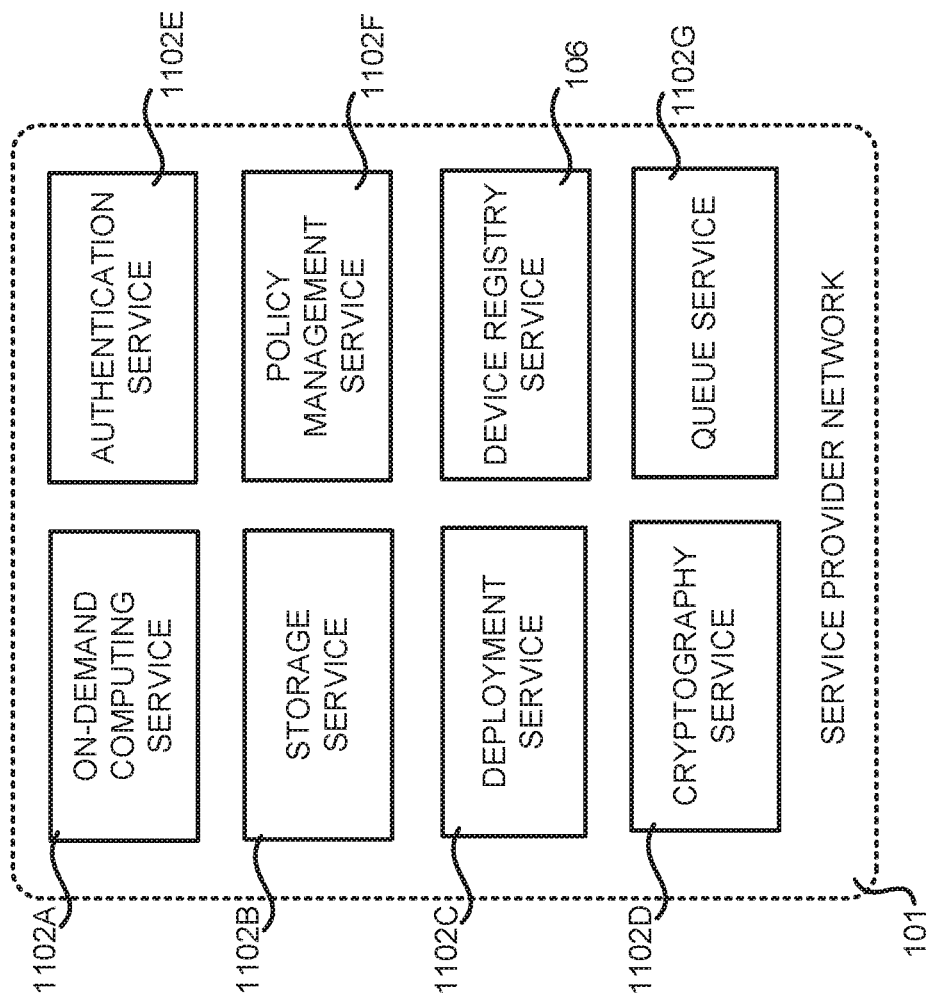
FIG. 11 is a system and network diagram that shows aspects of several services that can be provided by and utilized within a service provider network in one configuration disclosed herein.

FIG. 11 is a system and network diagram that shows aspects of several network services that can be provided by and utilized within a service provider network 101 in one configuration disclosed herein. In particular, and as discussed above, the service provider network 101 can provide a variety of network services to customers and other users of the service provider network 101 including, but not limited to, the device registry service 106, which was described in detail above.

The service provider network 101 can also provide other types of services including, but not limited to, an on-demand computing service 1102A, a storage service 1102B, a deployment service 1102C, a cryptography service 1102D, an authentication service 1102E, a policy management service 1102F, and/or a queue service 1102G, some of which are described in greater detail below. Additionally, the service provider network 101 can also provide other services, some of which are also described in greater detail below.

It should be appreciated that customers of the service provider network 101 can include organizations or individuals that utilize some or all of the services provided by the service provider network 101. As described above, a customer or other user can communicate with the service provider network 101 through a network, such as the network 902 shown in FIG. 9. Communications from a customer computing device, such as the computing device 900 shown in FIG. 9, to the service provider network 101 can cause the services provided by the service provider network 101 to operate in accordance with the described configurations or variations thereof.

It is noted that not all configurations described include the services described with reference to FIG. 11 and that additional services can be provided in addition to or as an alternative to services explicitly described. Each of the services shown in FIG. 11 can also expose web service interfaces that enable a caller to submit appropriately configured API calls to the various services through web service requests. In addition, each of the services can include service interfaces that enable the services to access each other (e.g., to enable a virtual computer system provided by the on-demand computing service 1102A to store data in or retrieve data from the data storage service 1102B). Additional details regarding some of the services shown in FIG. 11 will now be provided.

As discussed above, the on-demand computing service 1102A can be a collection of computing resources configured to instantiate VM instances and to provide other types of computing resources on demand. For example, a customer or other user of the service provider network 101 can interact with the on-demand computing service 1102A (via appropriately configured and authenticated API calls) to provision and operate VM instances that are instantiated on physical computing devices hosted and operated by the service provider network 101. The VM instances can be used for various purposes, such as to operate as servers supporting a web site, to operate business applications, to execute the device registry service 106 or, generally, to serve as computing resources for the customer. Other applications for the VM instances can be to support database applications, electronic commerce applications, business applications and/or other applications. Although the on-demand computing service 1102A is shown in FIG. 11, any other computer system or computer system service can be utilized in the service provider network 101, such as a computer system or computer system service that does not employ virtualization and instead provisions computing resources on dedicated or shared computers/servers and/or other physical devices.

The storage service 1102B can include software and computing resources that collectively operate to store data using block or file-level storage devices (and/or virtualizations thereof). The storage devices of the storage service 1102B can, for instance, be operationally attached to virtual computer systems provided by the on-demand computing service 1102A to serve as logical units (e.g., virtual drives) for the computer systems. A storage device can also enable the persistent storage of data used/generated by a corresponding virtual computer system where the virtual computer system service might only provide ephemeral data storage.

The service provider network 101 can also include a cryptography service 1102D. The cryptography service 1102D can utilize storage services of the service provider network 101, such as the storage service 1102B, to store encryption keys in encrypted form, whereby the keys are usable to decrypt customer keys accessible only to particular devices of the cryptography service 1102D. The cryptography service 1102C can also provide other types of functionality not specifically mentioned herein.

As illustrated in FIG. 11, the service provider network 101, in various configurations, also includes an authentication service 1102E and a policy management service 1102F. The authentication service 1102E, in one example, is a computer system (i.e., collection of computing resources 1004) configured to perform operations involved in authentication of users. For instance, one of the services 1102 shown in FIG. 11 can provide information from a user to the authentication service 1102E to receive information in return that indicates whether or not the requests submitted by the user are authentic.

The policy management service 1102F, in one example, is a network service configured to manage policies on behalf of customers or internal users of the service provider network 101. The policy management service 1102F can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 101 can additionally maintain other services based, at least in part, on the needs of its customers. For instance, the service provider network 101 can maintain a deployment service 1102C for deploying program code and/or a database service (not shown in FIG. 11) in some configurations. A database service can be a collection of computing resources that collectively operate to create, maintain, and allow queries to be performed on databases stored within the service provider network 101.

For example, a customer or other user of the service provider network 101 can operate and manage a database from the database service by utilizing appropriately configured network API calls. This, in turn, can allow the customer to maintain and potentially scale the operations in the database. Other services include object-level archival data storage services, and services that manage, monitor, interact with, or support other services. The service provider network 101 can also be configured with other services not specifically mentioned herein in other configurations.

Figure 12:
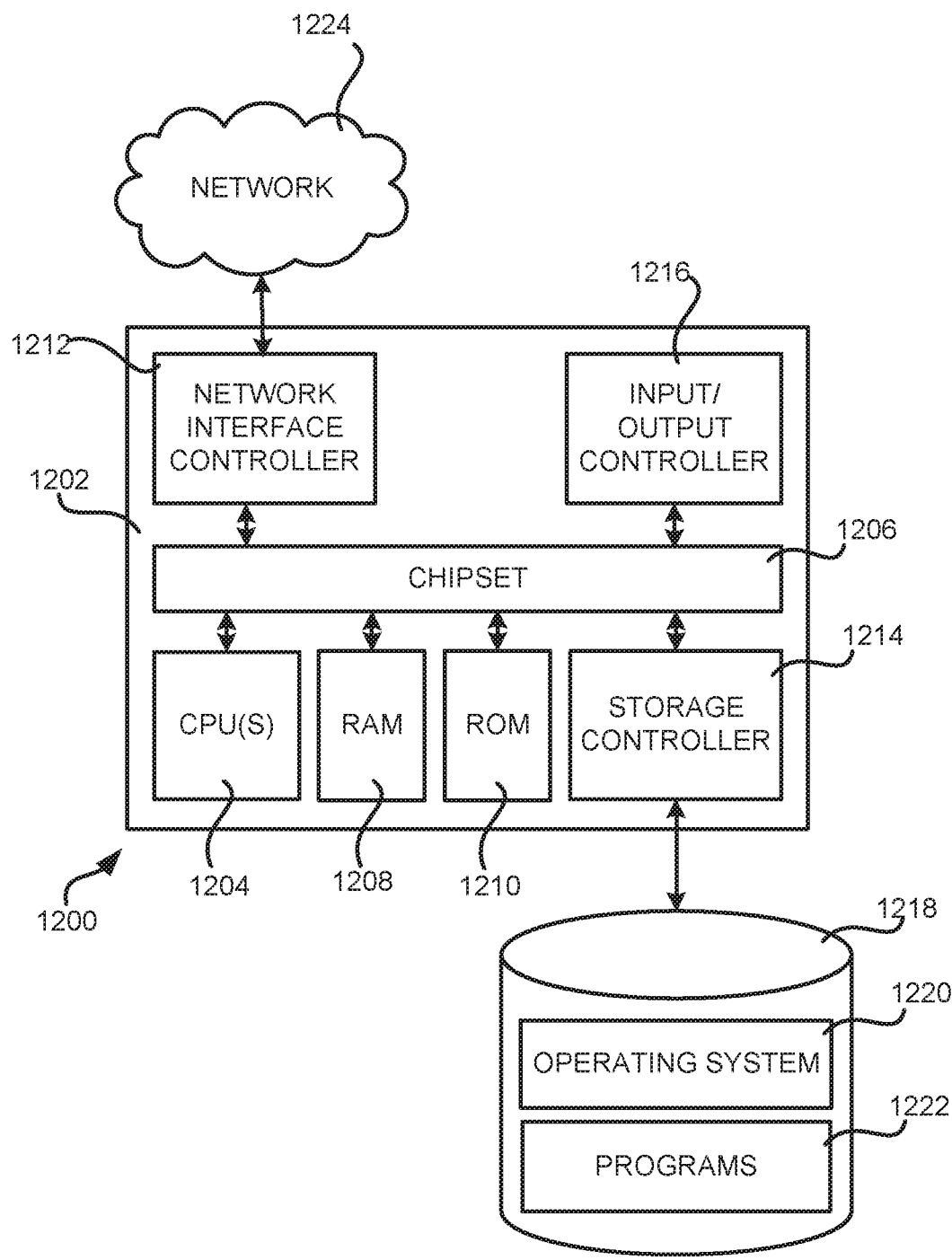
FIG. 12 schematically illustrates a computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The chipset 1206 can include functionality for providing network connectivity through a NIC 1212, such as a gigabit Ethernet adapter. The NIC 1212 is capable of connecting the computer 1200 to other computing devices over the network 1224. It should be appreciated that multiple NICs 1212 can be present in the computer 1200, connecting the computer to other types of networks and remote computer systems.

The computer 1200 can be connected to a mass storage device 1218 that provides non-volatile storage for the computer. The mass storage device 1218 can store an operating system 1220, programs 1222, and data, which have been described in greater detail herein. The mass storage device 1218 can be connected to the computer 1200 through a storage controller 1214 connected to the chipset 1206. The mass storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1218 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1218 is characterized as primary or secondary storage, and the like.

For example, the computer 1200 can store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1218 by detecting the physical states or characteristics of one or more particular locations within the physical storage units.

In addition to the mass storage device 1218 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 can store an operating system 1220 utilized to control the operation of the computer 1200. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 1218 can store other system or application programs and data utilized by the computer 1200.

In one configuration, the mass storage device 1218 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above with regard to FIGS. 1-11. The computer 1200 can also include computer-readable storage media for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or another type of output device. It will be appreciated that the computer 1200 might not include all of the components shown in FIG. 12, can include other components that are not explicitly shown in FIG. 12, or might utilize an architecture completely different than that shown in FIG. 12.

Based on the foregoing, it should be appreciated that technologies for a device registry service have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method within a service provider network that provides a device registry service configured to (i) register a plurality of devices as virtual representations of the plurality of devices and (ii) store data related to the plurality of devices, the method comprising:
   registering a device with the device registry service as a virtual representation of the device;
   classifying the device with a device type, wherein the device type relates to one or more first capabilities of the device;
   upon registration of the device with the device registry service, providing, to the device, one or more existing interfaces for the device that are stored at the device registry service for the device type, wherein the one or more existing interfaces allow for interaction of the device with other devices registered with the device registry service;
   determining that the one or more existing interfaces for the device type are at least in part incompatible with one or more second capabilities of the device;
   receiving a new interface for the device type relating to at least one of the one or more second capabilities of the device;
   providing, to the device, the new interface for implementation by the device;
   storing the new interface at the device registry service; and
   automatically providing the new interface to one or more devices registered with the device registry service and classified as the device type.

2. The method of claim 1, wherein receiving the new interface for implementation by the device comprises receiving, from a user of the device, the new interface for implementation by the device.

3. The method of claim 1, wherein receiving the new interface for implementation by the device comprises receiving, from a manufacturer of the device, the new interface for implementation by the device.

4. The method of claim 1, wherein receiving the new interface for implementation by the device comprises receiving, from a third party developer, the new interface for implementation by the device.

5. The method of claim 1, wherein providing the new interface to the one or more devices registered with the device registry service and classified as the device type comprises publishing the new interface through a publish-subscribe system.

6. The method of claim 1, wherein classifying the device with the device type comprises classifying the device based upon input regarding the one or more first capabilities of the device.

7. An apparatus providing a device registry service within a service provider network, the device registry service being configured to (i) register a plurality of devices as virtual representations of the plurality of devices and (ii) store data related to the plurality of devices, the apparatus comprising:
   one or more processors; and
   at least one computer-readable storage medium having computer-executable instructions stored thereupon which, when executed by the one or more processors, cause the apparatus to
   register a device with the device registry service as a device type as a virtual representation of the device,
   upon registration of the device with the device registry service, provide, to the device, one or more existing interfaces for the device that are stored at the device registry service for the device type, wherein the one or more existing interfaces allow for interaction of the device with other devices registered with the device registry service,
   determine that the one or more existing interfaces for the device type are at least in part incompatible with one or more capabilities of the device,
   receive a new interface relating to at least one of the one or more capabilities of the device;
   provide, to the device, the new interface for implementation by the device;
   store the new interface at the device registry service; and
   automatically provide the new interface to one or more devices registered with the device registry service as the device type.

8. The apparatus of claim 7, wherein the new interface is received from a user of the device.

9. The apparatus of claim 7, wherein the new interface is received from a manufacturer of the device.

10. The apparatus of claim 7, wherein the new interface is received from a third party developer of applications.

11. The apparatus of claim 7, wherein providing the new interface to the one or more devices registered with the device registry service and classified as the device type comprises publishing the new interface through a publish-subscribe system.

12. The apparatus of claim 7, wherein the device is registered based upon input regarding the one or more capabilities of the device.

13. The apparatus of claim 7, wherein the device is configured as an Internet of Things (IoT) device.

14. A system comprising:
one or more server computers hosting a device registry service, the device registry service being a service configured to (i) register a plurality of devices as virtual representations of the plurality of devices and (ii) store data related to the plurality of devices, wherein the device registry service is configured to
register a device with the device registry service based upon a device type, wherein the device type relates to one or more first capabilities of the device;
upon registration of the device with the device registry service, provide, to the device, one or more existing interfaces for the device for the device type, wherein the one or more existing interfaces allow for interaction of the device with other devices registered with the device registry service;
determine that the existing interfaces are at least in part incompatible with one or more second capabilities of the device;
receive a new interface relating to at least one of the one or more second capabilities of the device;
provide, to the device, the new interface for implementation by the device;
store the new interface at the device registry service; and
automatically provide the new interface to one or more devices registered with the device registry service as the device type.

15. The system of claim 14, wherein providing the new interface to the one or more devices registered with the device registry service and classified as the device type comprises publishing the new interface through a publish-subscribe system.

16. The system of claim 14, wherein the device type is based upon input regarding the one or more first capabilities of the device.

17. The system of claim 14, wherein the device comprises a device configured as an Internet of Things (IoT) device.

18. The system of claim 14, wherein the new interface is received from a user of the device.

19. The system of claim 14, wherein the new interface is received from a manufacturer of the device.

20. The system of claim 14, wherein the new interface is received from a third party developer of applications.

\* \* \* \* \*